United States Patent
Otsuka et al.

(10) Patent No.: US 7,969,256 B2
(45) Date of Patent: Jun. 28, 2011

(54) SIGNAL TRANSMISSION CIRCUIT AND SIGNAL TRANSMISSION SYSTEM WITH REDUCED REFLECTION

(75) Inventors: Kanji Otsuka, Tokyo (JP); Yutaka Akiyama, Tokyo (JP)

(73) Assignees: Fuji Xerox Co., Ltd., Tokyo (JP); Kanji Otsuka, Tokyo (JP); Yutaka Akiyama, Tokyo (JP); Fujitsu Semiconductor Limited, Kanagawa (JP); Renesas Technology Corp., Tokyo (JP); Ibiden Co., Ltd., Gifu (JP); Oki Semiconductor Co., Ltd., Tokyo (JP); Kabushiki Kaisha Toshiba, Tokyo (JP); Kyocera Corporation, Kyoto (JP)

( * ) Notice: Subject to any disclaimer, the term of this patent is extended or adjusted under 35 U.S.C. 154(b) by 333 days.

(21) Appl. No.: 12/153,786

(22) Filed: May 23, 2008

(65) Prior Publication Data

US 2008/0310521 A1 Dec. 18, 2008

(30) Foreign Application Priority Data

May 25, 2007 (JP) ................................. 2007-139403

(51) Int. Cl.
*H04B 3/28* (2006.01)
(52) U.S. Cl. .......................................... 333/12; 333/202

(58) Field of Classification Search ................. 333/28 R, 333/12, 167, 172, 202
See application file for complete search history.

(56) References Cited

U.S. PATENT DOCUMENTS

| 7,394,331 B2 * | 7/2008 | Yeung et al. ................. 333/28 R |
| 2002/0017963 A1 * | 2/2002 | Shimamoto et al. .............. 333/1 |

FOREIGN PATENT DOCUMENTS

| JP | 49-29565 | 8/1974 |
| JP | 2004-007657 | 1/2004 |
| JP | 2005-244733 | 9/2005 |
| JP | 2006-191355 | 7/2006 |

OTHER PUBLICATIONS

Japanese Office Action dated May 11, 2010 (with partial English translation).

* cited by examiner

*Primary Examiner* — Robert Pascal
*Assistant Examiner* — Kimberly E Glenn
(74) *Attorney, Agent, or Firm* — McGinn IP Law Group, PLLC

(57) ABSTRACT

A signal transmission circuit includes a transmitting circuit for outputting a transmitting signal to a transmission line, a parallel circuit including a capacitor and a first resistance connected between an output terminal of the transmitting circuit and the transmission line, and a series circuit including an inductor and a second resistance connected between an output side of the parallel circuit and a ground.

11 Claims, 11 Drawing Sheets

SIGNAL TRANSMISSION CIRCUIT AND SIGNAL TRANSMISSION SYSTEM WITH REDUCED REFLECTION

The present application is based on Japanese Patent Application No. 2007-139403 filed on May 25, 2007, the entire contents of which are incorporated herein by reference.

BACKGROUND OF THE INVENTION

1. Field of the Invention

The present invention relates to a signal transmission circuit and a signal transmission system.

2. Related Art

In a system having a pulse clock of GHz band, it is not possible to extend a wiring due to resistance loss, delay and loss by RC or dielectric loss. However, a long wiring becomes more and more important in an inter-block communication or the like, for example, high-speed transmission such as 100 Gbps in metal wiring is required for a LAN cable.

An inter-block wiring can be considered as a transmission line represented by a distributed constant circuit, and it is possible to correspond to high-speed transmission predicting loss characteristic by a transmission applying a pre-emphasis or a de-emphasis or by a correction by adjusting a waveform level by an equalizer.

An equalizer is, for example disclosed by JP-A-2006-191355, configured to be π type in that a resistance and a condenser are connected in parallel between transmission lines and that a resistance and an inductor are connected to Input/Output of the circuit by this parallel connection and a ground respectively. In this case, a condenser having low impedance with respect to a compensation bandwidth and an inductor having high impedance with respect to an amends band are used.

In an equalizer or a pre-emphasis, it is accordingly possible to control a waveform as long as a line with a bit width has the same structure and waveform disorder is constant, and in case of a LAN cable, it is possible to transmit 100 m at 1 Gbps.

However, for making these waveform disorders with a transistor circuit of output stage of a transmitting side, a transistor having a frequency characteristic of one digit higher than a clock signal is required. Compared with this, since a passive circuit does not basically have a nonlinearly frequency characteristic if a parasitic characteristic is decreased, it does not require a sophisticated transistor circuit technology and does not consume electric power actively. Therefore, high-speed transmission is allowed only by inserting the passive circuit into a signal system of each type of circuit.

Next, as a method for improving a characteristic on a receiving side, there is a de-emphasis as a representative example. In the de-emphasis, a crosstalk signal is superimposed in a halfway when waveform amplitude on the receiving side decreases, which causes an incorrect operation. To reduce this crosstalk signal, it is only necessary to reduce an expansion of an electromagnetic wave of the transmission line, and there is a coaxial cable as a representative example.

Further, there is a reflection as a phenomenon which causes a trouble in the transmission line. In the transmission line, an energy which returned to the transmission line reflecting at a discontinuous point repeats a multiple reflection by reflecting again at the discontinuous point on a return side, and when sympathetic vibration etc. occurs, it becomes a totally unpredictable transmission waveform. Therefore, it is required to prevent an occurrence of the multiple reflections.

THE SUMMARY OF THE INVENTION

Therefore, it is an object of the invention to provide a signal transmission circuit and a signal transmission system which allow a high bandwidth transmission in a transmission line of a metal.

[1] According to one embodiment of the present invention, a signal transmission circuit comprises:

a transmitting circuit for outputting a transmitting signal to a transmission line;

a parallel circuit comprising a capacitor and a first resistance connected between an output terminal of the transmitting circuit and the transmission line; and a series circuit comprising an inductor and a second resistance connected between an output side of the parallel circuit and a ground.

In the above embodiment [1], the following modifications and changes can be made.

(i) The transmitting circuit satisfies a relation: $tr \geq CZ$ or $tf \geq CZ$ where tr and tf are a rise time and a fall time of its output waveform, respectively, Z is a characteristic impedance of the transmission line, and C is an electrostatic capacitance of the capacitor.

(ii) The transmitting circuit satisfies a relation $tr \geq L/R_2$ or $tf \geq L/R_2$ where a rise time and a fall time of its output waveform are tr and tf, the second resistance is $R_2$ and an inductance of the inductor is L.

(iii) The transmission line comprises a differential signal transmission line, the transmitting circuit outputs a differential signal from first and second output terminals to the differential signal transmission line, the parallel circuit comprises a first parallel circuit and a second parallel circuit connected between the first and second output terminals, respectively, and the differential signal transmission line, and the series circuit comprises a first series circuit and a second series circuit connected between an output side of the first and second parallel circuits, respectively, and a ground.

(iv) The transmitting circuit satisfies a relation: $tr \geq CZ$ or $tf \geq CZ$ where tr and tf are a rise time and a fall time of its output waveform, respectively, Z is a characteristic impedance of the transmission line, and C is an electrostatic capacitance of the capacitor.

(v) The transmitting circuit satisfies a relation $tr \geq L/R_2$ or $tf \geq L/R_2$ where a rise time and a fall time of its output waveform are tr and tf, the second resistance is $R_2$ and an inductance of the inductor is L.

[2] According to another embodiment of the present invention, a signal transmission system comprises:

a transmission line comprising a ground line;

a transmitting circuit for outputting a transmitting signal to the transmission line;

a receiving circuit for receiving a signal from the transmission line;

a parallel circuit comprising a capacitor and a first resistance connected between an output terminal of the transmitting circuit and the transmission line; and a series circuit comprising an inductor and a second resistance connected between an output side of the parallel circuit and a ground.

In the above embodiment [2], the following modifications and changes can be made.

(vi) The transmission line comprises a stacked pair type single end transmission line that a signal line is paired with a ground line.

(vii) The stacked pair type single end transmission line comprises a wiring width w that is approximately equal to a clearance d between adjacent stacked pairs of wiring.

(viii) The transmission line further comprises a power source ground pair transmission line.

[3] According to another embodiment of the present invention, a signal transmission system comprises:

a differential signal transmission line for transmitting a differential signal;

a transmitting circuit for outputting the differential signal from first and second output terminals to the differential signal transmission line;

a receiving circuit for receiving a signal from the differential signal transmission line;

a first parallel circuit comprising a first capacitor and a first residence connected between the first output terminal and the differential signal transmission line;

a first series circuit comprising a first inductor and a second residence connected between an output side of the first parallel circuit and a ground;

a second parallel circuit comprising a second capacitor and a third residence connected between the second output terminal and the differential signal transmission line; and a second series circuit comprising a second inductor and a fourth resistance connected between output side of the parallel circuit and a ground.

In the above embodiment [3], the following modifications and changes can be made.

(ix) The differential signal transmission line comprises a clearance of $2d$ or more between adjacent pairs of wiring where d is a clearance between one pair of wirings.

(x) The transmitting circuit satisfies a relation: $tr \geq CZ$ or $tf \geq CZ$ where tr and tf are a rise time and a fall time of its output waveform, respectively, Z is a characteristic impedance of the transmission line, and C is an electrostatic capacitance of the capacitor.

(xi) The transmitting circuit satisfies a relation $tr \geq L/R_2$ or $tf \geq L/R_2$ where a rise time and a fall time of its output waveform are tr and tf, the second resistance is $R_2$ and an inductance of the inductor is L.

Effects of the Embodiments

According to the signal transmission circuit or system of the embodiments [1] to [3], it is possible to allow a high bandwidth transmission in a transmission line of a metal.

According to the signal transmission circuit or system of the embodiments [1] (i)-(v) and [3] (x)-(xi), it is possible to obtain a spike waveform where rise time and fall time are approximately same.

According to the signal transmission system of the embodiment [2] (vi), it is possible to reduce a crosstalk.

According to the signal transmission system of the embodiment [2] (vii) and [3] (ix), it is possible to reduce repeated reflection of a transmission signal and a crosstalk.

According to the signal transmission system of the embodiment [2] (viii), it is possible to supply a power source by letting a power source ground pair transmission line into a circuit connected to the transmission line.

BRIEF DESCRIPTION OF THE DRAWINGS

Next, the present invention will be explained in more detail in conjunction with appended drawings, wherein:

FIGS. 3A and 3B show measurement results of eye patterns of a random waveform in a comparative example in which a transmission frequency is 500 MHz without providing an inductor and a second resistance, wherein FIG. 3A shows an eye pattern of a transmitting signal and FIG. 3B shows an eye pattern of a received signal;

FIGS. 4A and 4B show eye patterns in the first preferred embodiment when the condition of FIG. 3 is replicated by the signal transmission circuit of FIG. 1 to which an inductor and a second resistance are inserted, wherein FIG. 4A shows an eye pattern of the transmitting signal and FIG. 4B shows an eye pattern of the received signal;

FIGS. 5A, 5B and 5C show waveforms before and after passing through a passive equalizer, wherein FIG. 5A shows a waveform diagram when a capacitor discharges electricity at an RC time constant appropriate for characteristic impedance of a single end transmission line in a structure without providing an inductor and a second resistance, FIG. 5B shows a waveform diagram when a clock time is shorter than that of FIG. 5A under the same condition as FIG. 5A, and FIG. 5C shows a waveform diagram when an inductor and a second resistance are provided under the same condition as FIG. 5B;

DESCRIPTION OF THE PREFERRED EMBODIMENTS

Next, preferred embodiments according to the present invention will be explained in conjunction with appended drawings.

First Embodiment

Structure of the Signal Transmission Circuit

Figure 1:
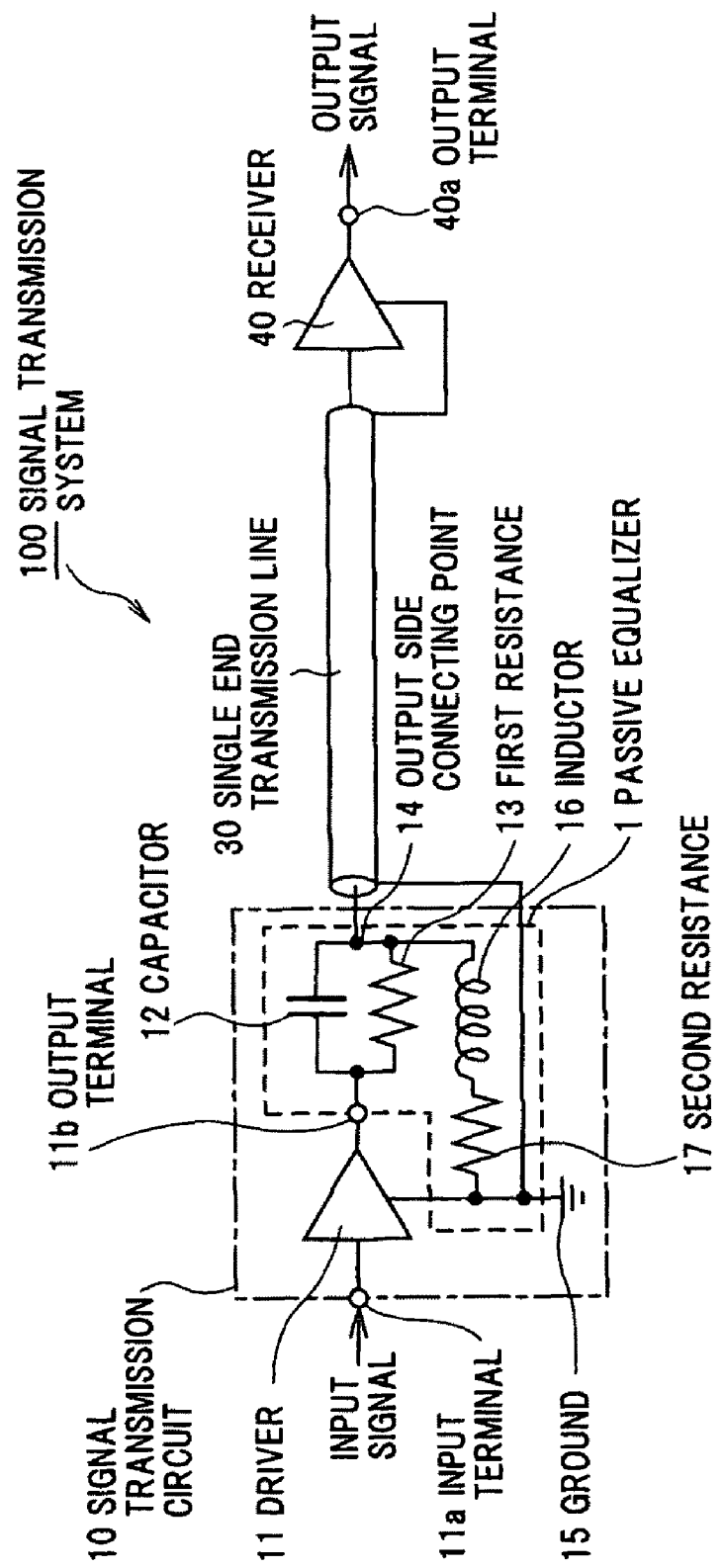
FIG. 1 is a circuit diagram showing a signal transmission system in then first preferred embodiment according to the present invention.

FIG. 1 is a circuit diagram showing a signal transmission system in then first preferred embodiment according to the present invention A signal transmission system 100 comprises a signal transmission circuit 10, a single end transmission line 30 of a metal connected to the signal transmission circuit 10 and a receiver 40 (herein also referred to as "receiving circuit") connected to the single end transmission line 30 and adapted to output an output signal from an output terminal 40a.

The signal transmission system 100 comprises a driver 11 (herein also referred to as "transmitting circuit") for loading an input signal through an input terminal 11a and for outputting a transmitting signal from an output terminal 11b, and a passive equalizer 1 comprising a parallel circuit where a capacitor 12 is connected in parallel to a first resistance 13 and a series circuit where a second resistance 17 is connected in series to an inductor 16.

The respective ends of the capacitor 12 and the first resistance 13 are connected to the output terminal 11b of the driver 11. The inductor 16 and the second resistance 17 are connected in series between a ground 15 and an output side connecting point 14 to which the other respective ends of the capacitor 12 and the first resistance 13 are commonly connected.

The receiver 40 receives a signal through the single end transmission line 30 at high impedance by decreasing an input electrostatic capacitance to increase the received signal as much as possible. That is, it is operable in quasi-total reflection.

In addition to a purpose of securing impedance of the inductor 16 in a direct electric current, the second resistance 17 is provided such that, when a signal reaching an input terminal of the receiver 40 from the single end transmission line 30 is totally reflected at the input terminal, it can absorb a reflected wave returned to the output terminal of the passive equalizer 1 flowing back through the single end transmission line 30 for preventing a repeated reflection.

Operation of the Signal Transmission System

Next, an operation of the signal transmission system 100 will be explained referring a diagram.

Figure 5A:
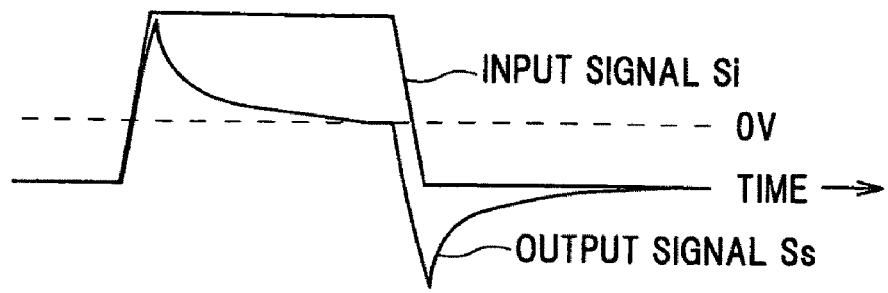
Figure 5B:
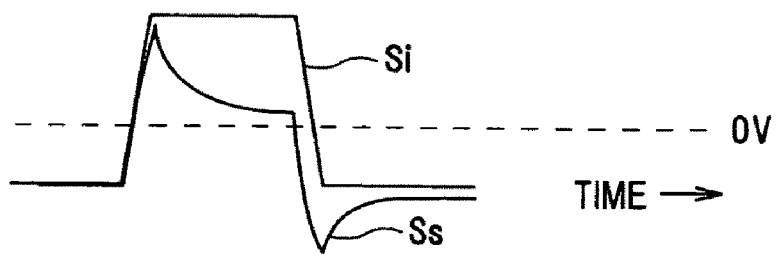
Figure 5C:
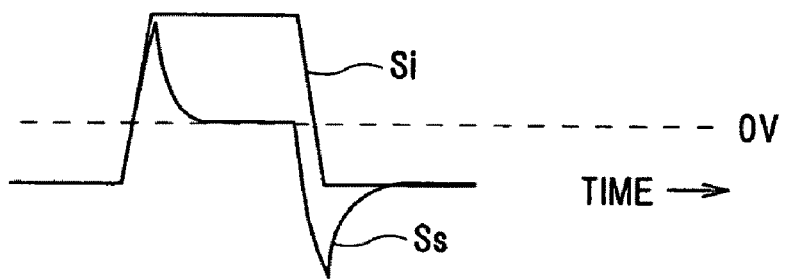

FIG. 5A, FIG. 5B and FIG. 5C show waveforms before and after passing through the passive equalizer 1. FIG. 5A shows a waveform diagram when a capacitor 12 discharges electricity at an RC time constant appropriate for characteristic impedance of the single end transmission line 30 in a structure without providing the inductor 16 and the second resistance 17. FIG. 5B shows a waveform diagram when a clock time is shorter than that of FIG. 5A under the same condition as FIG. 5A. FIG. 5C shows a waveform diagram when the inductor 16 and the second resistance 17 are provided under the same condition as FIG. 5B.

Firstly, as a comparative example, the operation without the inductor 16 and the second resistance 17 will be explained below.

A transmitting signal (an output signal) corresponding to an input signal Si shown in FIG. 5A is outputted by the driver 11 to the single end transmission line 30 through the parallel circuit with the capacitor 12 and the first resistance 13, and is received by the receiver 40.

For the transmitting signal outputted from the driver 11 at its rising and falling regions where voltage changes steeply, the capacitor 12 is momentarily charged since its impedance is nearly 0 there. Then, as shown in FIG. 5A, it is discharged at a RC time constant of the capacitor 12 and the first resistance 13, and generates an output signal Ss (an output power of the passive equalizer 1) lasting to level 0.

When the input signal Si is turned off, the output signal Ss shifts to a negative side due to discharge of the capacitor 12, and is then converged to the level 0 at the same RC time constant as the positive side. This waveform is a typical characteristic of the de-emphasis waveform.

Then, when the output signal of the driver 11 is in a stable state of H or L (constant voltage level), the capacitor 12 becomes high impedance against the output signal so that only the first resistance 13 is inserted to the output terminal 11b of the driver 11, where amplitude of the output signal of the driver 11 attenuates according to a resistance value of the first resistance 13.

Since the energy of a direct current component in the first resistance 13 can be mostly ignored compared with that of a spike waveform, the resistance value may be increased to 1 MΩ or more so as to zero the substantial amplitude. In particular, it is effective in a frequency range of 10 GHz or more.

Then, as shown in FIG. 5B, when the clock time is shortened as compared to the case of FIG. 5A, off timing comes before reaching the steady state, so that electric charge of the capacitor 12 influences the subsequent signal waveform such that a jitter in signal timing increases.

The operation of the passive equalizer 1 where the inductor 16 and the second resistance 17 are added to the capacitor 12 and the first resistance 13 (in the embodiment of the invention) will be explained below.

Where the inductor 16 and the second resistance 17 are added, as shown FIG. 5C, the inductor 16 does not obstruct the effect of the capacitor 12 while exhibiting high impedance when the signal changes steeply, but it absorbs electrical charge discharged from the capacitor 12 while exhibiting low impedance when the signal changes slowly.

That is, the inductor 16 absorbs the electrical charge of the capacitor 12 when the signal waveform at the output terminal of the driver 11 falls so as to prevent the prolongation in discharging the capacitor 12, so that the fall of the transmission waveform is steepened. As a result, the de-emphasis waveform suitable for high-speed signal is outputted from the passive equalizer 1.

Since the parameter of each element comprising the passive equalizer 1 is defined by the transient response formula of a digital spectrum, different from the parameter defined by attenuation as in the equalizer disclosed by JP-A-2006-191355, it has no variation.

Operating Conditions of the Signal Transmission Circuit 10

The signal transmission circuit 10 should follow a rise time tr and a fall time tf of the output waveform of the driver 11 shown in FIG. 1. A load of the driver 11 is a characteristic impedance Z of the single end transmission line 30. In this case, a voltage $V_1$ change of the electrostatic capacitance C of the capacitor 12 is represented as follows where an output power of the driver 11 is Vdd.

$$V_1 = 1 - \exp(t/CZ)\}$$

The rise time determined by this time constant is less than the rise time tr and the fall time tf as below, however, it is preferably approximately equal thereto.

$$tr \geq CZ, \text{ or } tf \geq CZ.$$

Since the characteristic impedance Z of the single end transmission line 30 is determined uniquely, these conditions can be obtained by changing C.

The charged electrostatic capacitance C is discharged being prolonged due to the subsequent implantation of pulse energy. The following change is made between the an inductance L of the inductor 16 for extracting this charge to the ground at the same time constant, and a voltage $V_2$ of the second resistance 17 (a resistance value $R_2$) as a load.

$$V_2 = V_1\{1 - \exp(tr_2/L)\}$$

Therefore, conditions needed for the passive equalizer 1 are as follows.

$$tr \geq L/R_2, \text{ or } tf \geq L/R_2.$$

Figure 6:
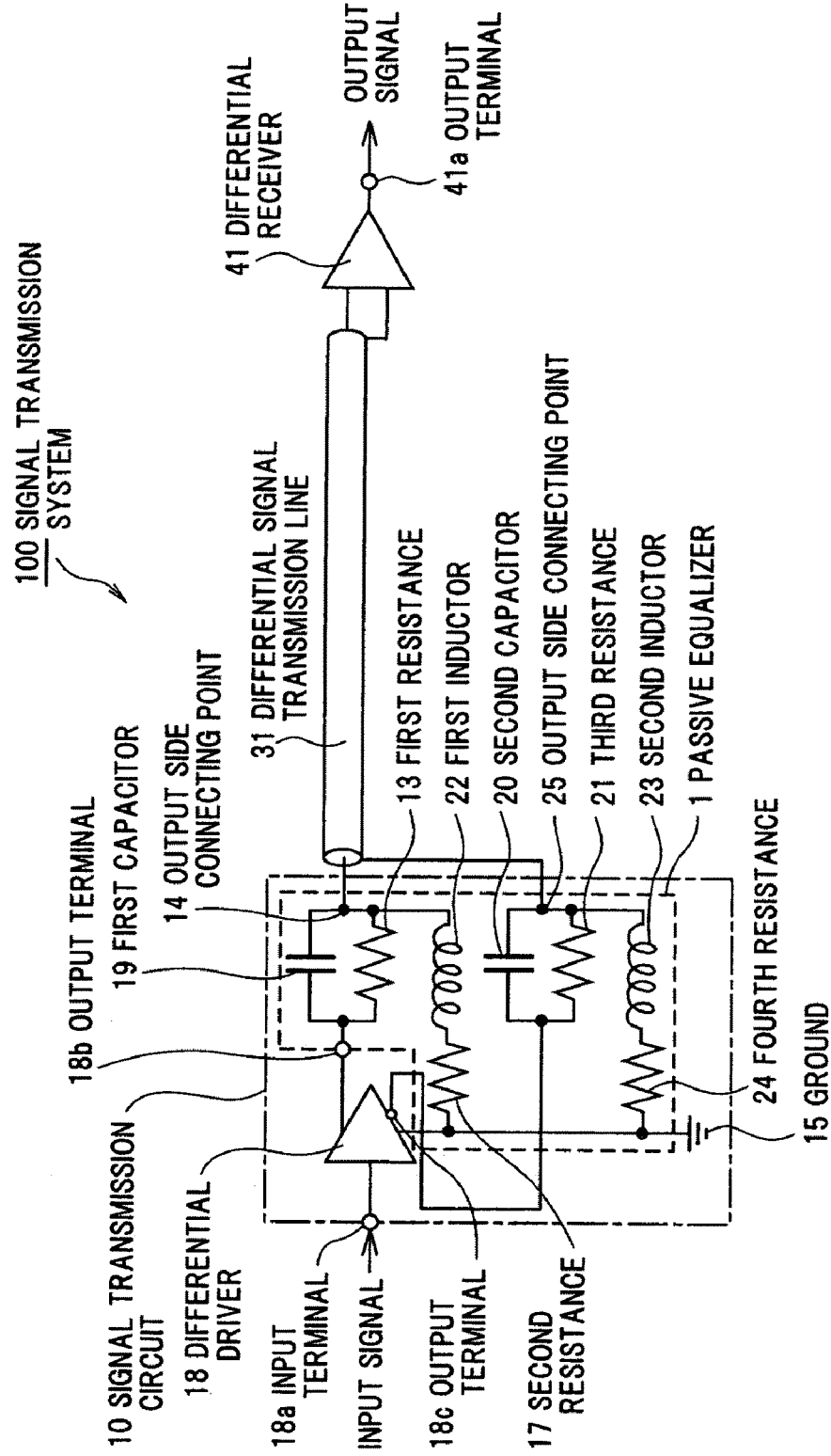
FIG. 6 is a circuit diagram showing a signal transmission system in the second preferred embodiment according to the present invention.

Since $R_2$ is an absorption end of a reflected wave, hence a given value ($R_2=Z$ in case of the single end as shown in FIG. 1 and $R_2=Z/2$ in case of a differential transmission as shown in FIG. 6 described later), and these conditions can be obtained by changing the inductance L.

As known in the art, the resistance value $R_1$ of the first resistance 13 is adjusted such that a direct current component of the pulse is attenuated to the amplitude for the next transition timing, which is 35 mV in actual measurement. This is equivalent to amplitude (33.9 mV) of a received signal waveform after passing through a 100 m cable of FIG. 2 described later.

Next, a comparative example corresponding to the first preferred embodiment will be explained.

Comparative Example

Figure 2A:
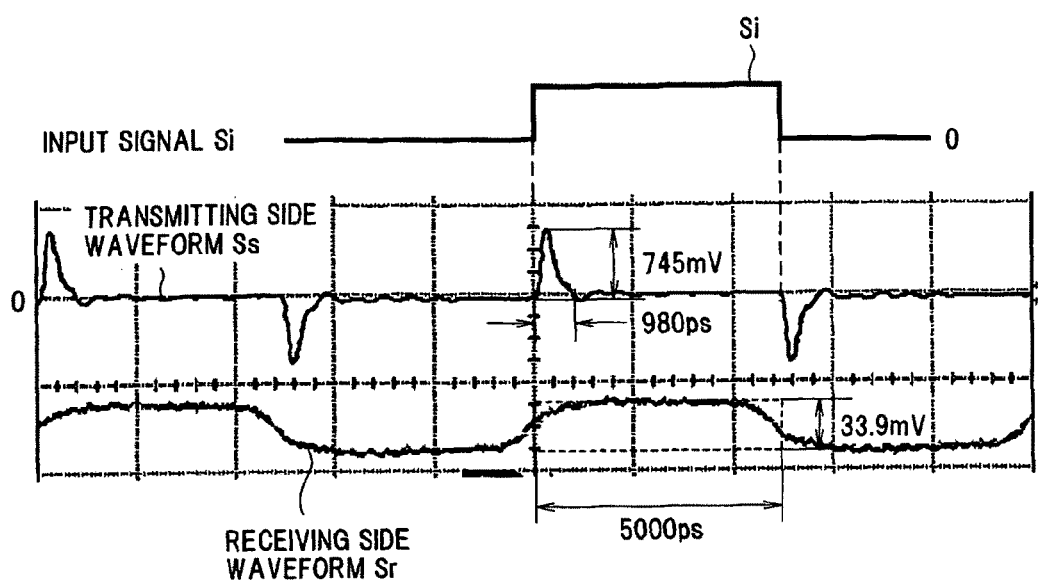
FIGS. 2A and 2B are waveform charts showing a comparative example.

FIG. 2A is a waveform chart showing a transmitting side waveform Ss and a receiving side waveform Sr where the parallel circuit composed of the capacitor 12 and the first resistance 13 is connected to the output terminal of the driver 11 without the series circuit composed of the inductor 16 and the second resistance 17, a LAN cable of 100 m as a single end transmission line 30 is connected to this, and a signal is transmitted at 100 MHz.

In referring to the receiving side waveform Sr of FIG. 2A, since the electric current does not change when processing an input signal Si by the passive equalizer 1, the energy of a transmitting signal of a differential waveform (a transmitting side waveform Ss) which is 745 mV×480 ps/2=357.6 pVs is received as an integral waveform with an energy of 33.9 mV×5000 ps=169.5 pVs on the receiving side. Namely, the receiver 40 receives the receiving side waveform Sr of a trapezoidal wave which is approximated to the input signal Si.

Figure 2B:
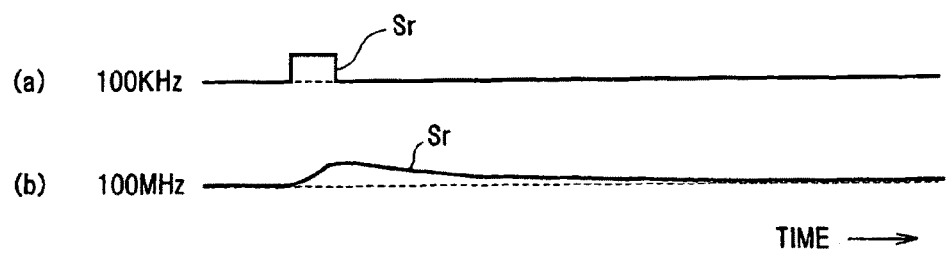

FIG. 2B is a waveform chart showing a waveform Sr on the receiving side when transmitting a single pulse of 100 KHz or 100 MHz to a coaxial cable of 100 m in length to which the parallel circuit is not connected.

As shown in FIG. 2B(a), when transmitting a pulse signal of 100 KHz to the coaxial cable, disorder of the signal waveform Sr is not seen at the receiving terminal due to low frequency.

Meanwhile, as shown in FIG. 2B(b), when transmitting a high frequency pulse signal of 100 MHz without applying a de-emphasis or the like, attenuation of about 30 dB occurs by defusing an electromagnetic energy to a temporal axis and it is not possible to transmit a signal by disorder of the waveform.

Compared with this, according to the first preferred embodiment, the capacitor 12 is charged (differentiated) at the rise and fall portion where input signal Si changes steeply and the passive equalizer 1 absorbs electric charge of the capacitor 12 by the inductor 16 at a stage where the signal changes slowly, so that a sharp waveform can be obtained. Further, the attenuation is about 6 dB.

Figure 3A:
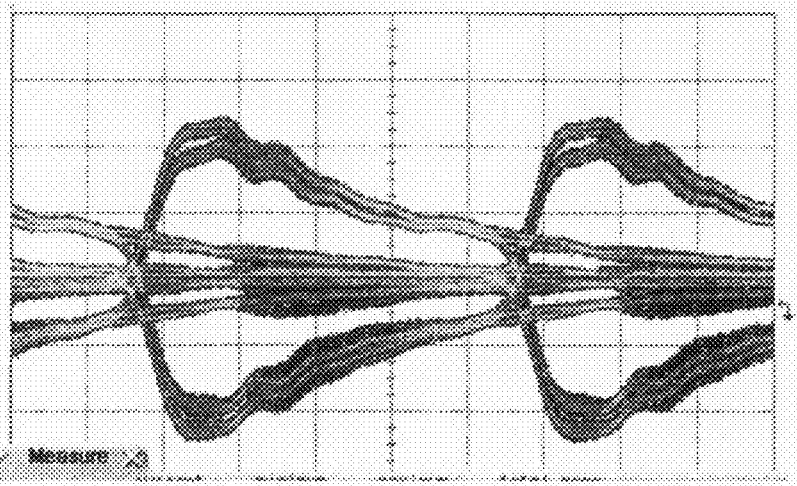
Figure 3B:
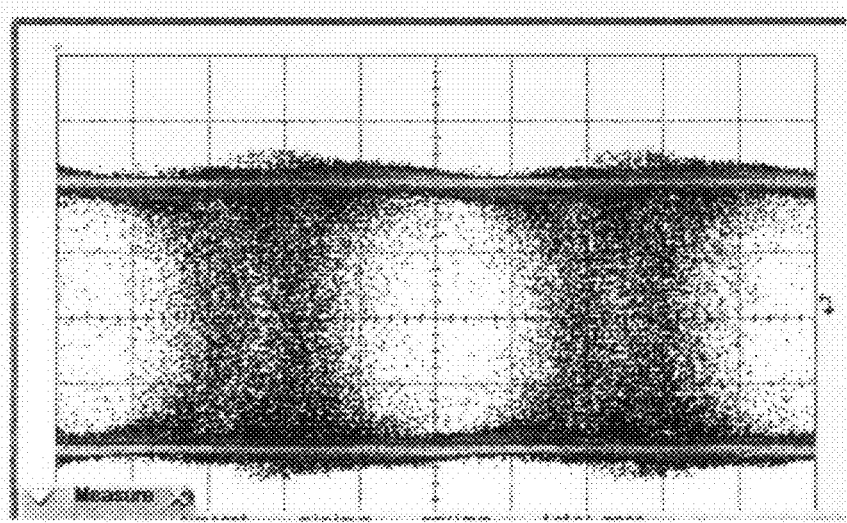

Eye Pattern when the Series Circuit is not Applied to the Signal Transmission Circuit FIG. 3A and FIG. 3B show measurement results of eye patterns of a random waveform in a structure in which a transmission frequency is 500 MHz without providing an inductor 16 and a second resistance 17, wherein FIG. 3A shows an eye pattern of a transmitting signal and FIG. 3B shows an eye pattern of a received signal.

Referring to FIG. 3, a fall of the differential waveform (eye pattern) remains at the time of next transition, which disorders a rising edge of the next waveform and generates a big jitter. This frequency level is a threshold frequency of this cable.

To shorten a fall of the waveform shown in FIG. 3, it is effective to extract this energy steeply to the ground. An insertion of the series circuit comprising the inductor 16 and the second resistance 17 is a device for this.

Figure 4A:
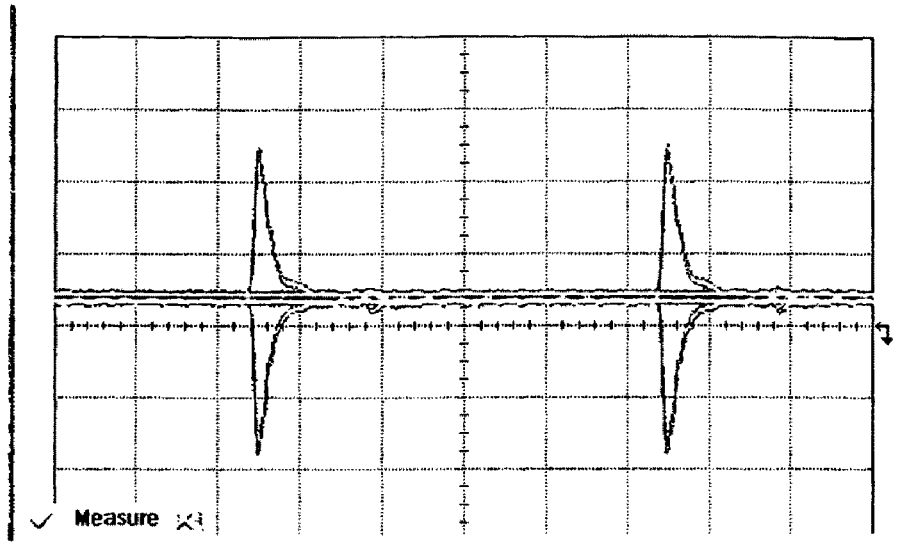
Figure 4B:
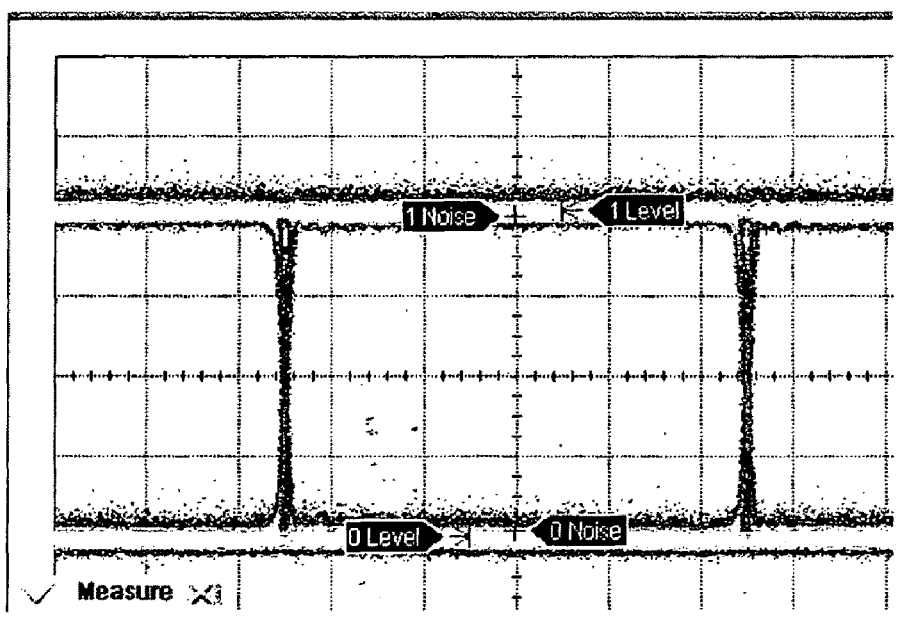

Eye Pattern when the Series Circuit is Applied to the Signal Transmission Circuit FIG. 4A and FIG. 4B show eye patterns when the condition of FIG. 3 is replicated by the signal transmission circuit 10 of FIG. 1 to which an inductor 16 and a second resistance 17 are inserted, wherein FIG. 4A shows an eye pattern of the transmitting signal and FIG. 4B shows an eye pattern of the received signal.

As it is obvious from FIG. 4A, the rise time and the fall time of the transmitting signal become approximately same spike waveform by the passive equalizer. When transmitting the transmitting signal of this waveform through the single end transmitting line 30 of 100 m in length, the jitter of the receiving waveform of the receiver 40 is 50 ps in the actual measurement and an improvement of the frequency characteristic can be fully expected, hence the metal transmission at 2 GHz becomes fully possible.

The inductor 16 is configured to exhibit inactiveness when the capacitor 12 functions effectively, and to become low impedance when the signal change slows down.

The impedance of the inductor 16 becomes 0 in a direct current state. Therefore, the second resistance 17 is connected in series to the inductor 16 so as to have impedance against the direct current. Further, the second resistance 17 also functions as a termination resistor against the reflected signal from the portion where the impedance in the transmission line system does not match.

Second Embodiment

FIG. 6 is a circuit diagram showing a signal transmission system in the second preferred embodiment according to the present invention.

Structure of the Signal Transmission System 100

The signal transmission system 100 according to the second preferred embodiment comprises the signal transmission circuit 10 adopting a differential structure to the signal transmission circuit 10 of the first preferred embodiment, a differential signal transmission line 31 of a metal connected to the signal transmission circuit 10 and a differential receiver 41 for outputting an output signal from its output terminal 41a connected to the differential signal transmission line 31.

The signal transmission circuit 10 of this preferred embodiment is the signal transmission line 10 of the first preferred embodiment wherein a differential driver 18 composed of an input terminal 18a and a pair of output terminals 18b, 18c is used instead of the driver 11, a first parallel circuit comprising a first capacitor 19 and a first resistance 13 is connected to the positive output terminal 18b, a second parallel circuit comprising a second capacitor 20 and a third resistance 21 is connected to the negative output terminal 18c, a first series circuit comprising a first inductor 22 and a second resistance 17 is connected between the output side connecting point 14 and a ground 15 and a second series circuit comprising a second inductor 23 and a fourth resistance 24 is connected between a output side connecting point 25 and the ground 15. The output side connecting point 25 is the point to where respective output side of the second capacitor 20 and the third resistance 21 are connected.

In the signal transmission circuit 10, the passive equalizer comprises the first resistance 13, the second resistance 17, the first capacitor 19, the second capacitor 20, the third resistance 21, the first inductor 22, the second inductor 23 and the fourth resistance 24.

The receiver 41 receives a signal from the differential signal transmission line 31 in high impedance by minimizing an input electrostatic capacitance to allow the received signal to be increased as much as possible. That is, it is movable in quasi-total reflection.

In the same way as the first preferred embodiment, as well as for a purpose of ensuring impedance of the first inductor 16 and the second inductor 23 in a direct electric current, the second resistances 17 and the fourth resistance 24 are provided so that a signal reached to an input terminal of the differential receiver 41 from the differential signal transmission line 31 is totally reflected at the input terminal, absorbs a reflected wave returned to the output terminal flowing back in the differential signal transmission line 31 and prevents a repeated reflection.

Operation of the Signal Transmission System

Next, an operation of the signal transmission system of the second preferred embodiment will be explained.

A signal from the positive terminal 18b of the differential driver 18 is outputted to a core wire of the differential signal transmission line 31 through the first parallel circuit comprising the first capacitor 19 and the first resistance 13, a signal from the negative terminal 18c is outputted to a jacket (shield) of the differential signal transmission line 31 through the second parallel circuit comprising the second capacitor 20 and the third resistance 21 and the respective signals are transmitted to the differential receiver 41.

In this way, the first capacitor 19 and the second capacitor 20 react to a steep change of the differential signal from the positive and negative terminals 18b, 18c of the differential driver 18 and accurately outputs a waveform in the state that the impedance is approximately 0. Then, when the differential signal becomes a stable state of H or L, the first capacitor 19 and the second capacitor 20 do not function, the first resistance 13 and the third resistance 21 are inserted, and the amplitude of the differential signal attenuates corresponding to resistance values of the first resistance 13 and the second resistance 21.

At this time, although the first inductor 22 and the second inductor 23 have high impedance when the differential signal is changing, they have low impedance when the change of the differential signal is small so that they absorb electrical charge at the signal fall timing of the first capacitor 19 and the second capacitor 20. As a result, the received signal by the differential receiver 41 becomes a signal with a steep fall.

As shown in the receiving side waveform of FIG. 2, since the pulse amplitude is small after passing through the differential signal transmission line 31, a high-sensitivity differential receiver 41 is required. As a commercial product of this differential receiver 41, for example, there is "3748" of Maxim Integrated Products, Inc. in which the amplitude up to 5 m is amplified up to 800 m and also available for use up to 3 Gbps level. Further, as an improved product of "3748", there is "MAX3971A" of this company which can be used up to 10 Gbps.

Further, in the second preferred embodiment, the rise time tr and the fall time tf are required to fulfill the relation tr≧CZ, tf≧CZ, tr≧L/R$_2$ and tf≧L/R$_2$ which is same as the first preferred embodiment.

Third Embodiment

Figure 7:
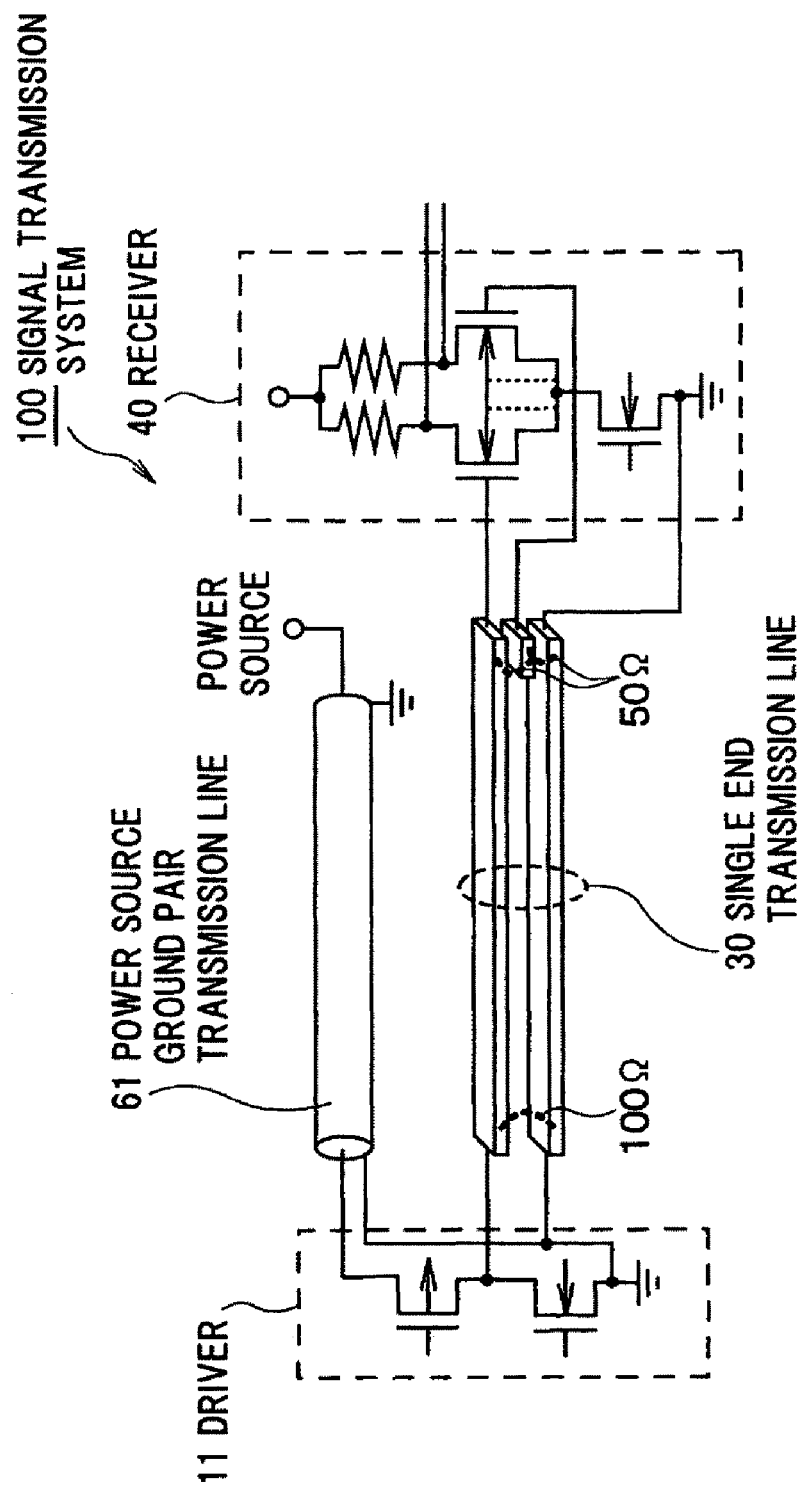
FIG. 7 is a connection wiring diagram showing a signal transmission system in the third preferred embodiment according to the present invention.

FIG. 7 is a connection wiring diagram showing a signal transmission system in the third preferred embodiment according to the present invention.

This embodiment comprises a wiring pattern having a layered structure in which the single end transmission line 30 in the first preferred embodiment is replaced to a coaxial cable, wherein one of the wiring patterns is a ground. The ground is use for a reference of a bias compensation.

Further, in FIG. 7, a power source ground pair transmission line 61 comprising a coaxial cable or the like is used for a power supply from the driver 11 side to the driver 40. In this preferred embodiment, the illustration of the passive equalizer 1 is omitted.

In the third preferred embodiment, it is possible to use the wiring pattern having a layered structure for a wiring of a printed circuit board (not shown) mounting the driver 11 and the receiver 40. It will be explained showing a diagram as below.

Figure 8:
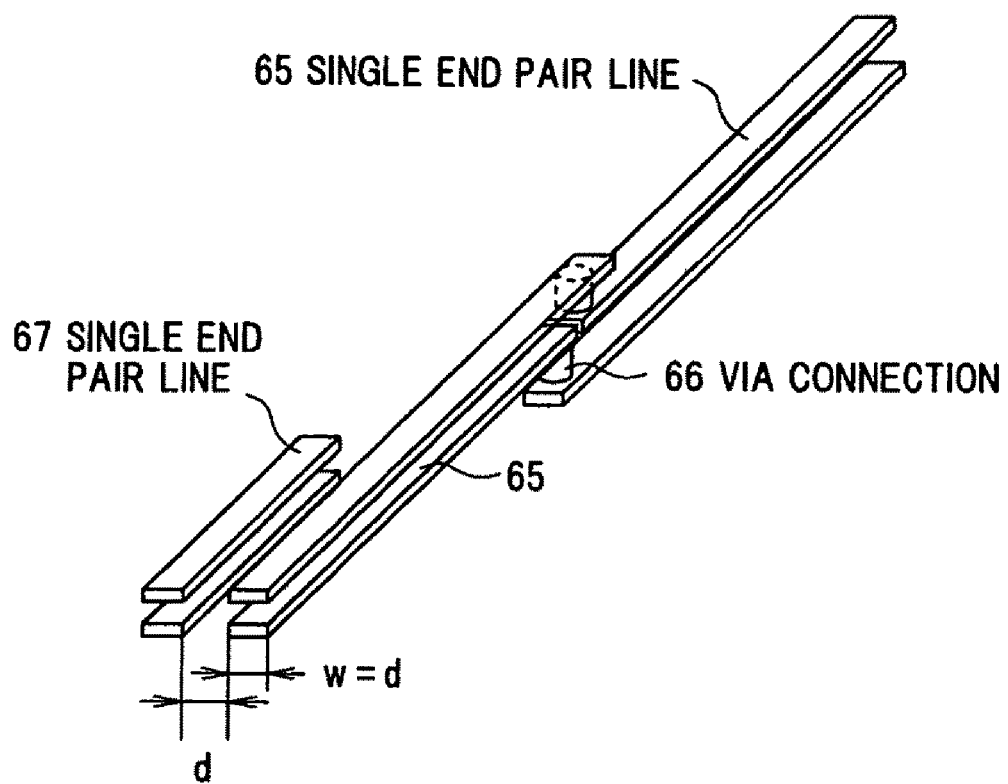
FIG. 8 is a perspective view showing a structure of a single pair end line in a printed circuit board in the third preferred embodiment according to the present invention.

FIG. 8 is a perspective view showing a structure of a single pair end line in a printed circuit board. A single pair end line 65 comprises a pair of belt-like wiring pattern with a predetermined clearance above and below and they are connected each other with a via connection 66 at the portion where a step is needed to be provided.

Since the impedance of the single pair end line 65 is $Z_0=50\Omega$, it is difficult to wire in parallel, hence a stacked pair wiring in which a signal line is paired with a ground line is provided. One of them is a ground wiring and a solid ground or a solid power layer is not provided around the wiring like a general printed circuit board. In this case, even if a wiring width w and an inter-adjacent single end pair lines 67 clearance d are same (w=d), a crosstalk occurs little.

Fourth Embodiment

Figure 9:
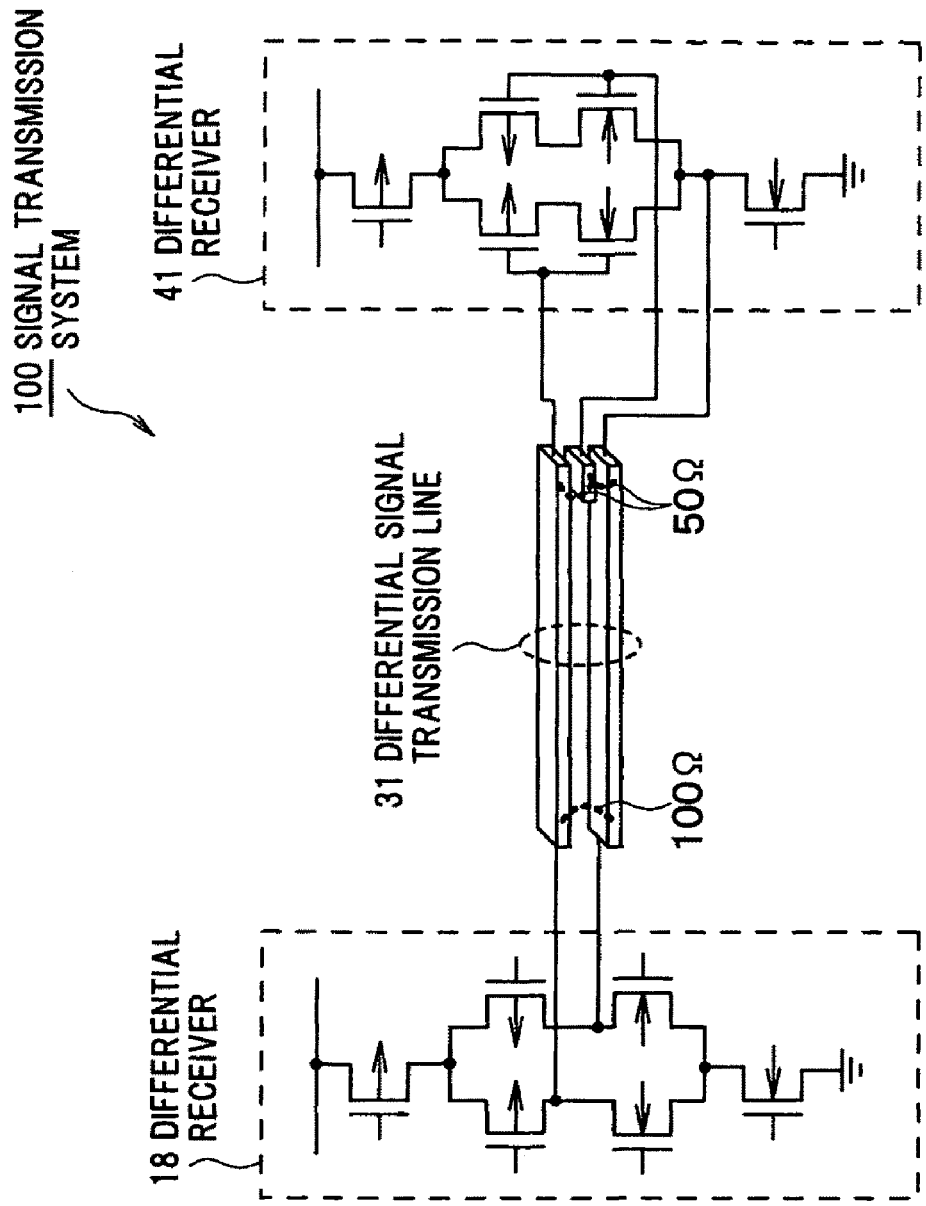
FIG. 9 is a connection wiring diagram showing a signal transmission system in the fourth preferred embodiment according to the present invention.

FIG. 9 is a connection wiring diagram showing a signal transmission system in the fourth preferred embodiment according to the present invention. This embodiment comprises a wiring pattern having a layered structure in which the differential signal transmitting line 31 in the first preferred embodiment is replaced to a coaxial cable, wherein the above and below wiring patterns are connected to a differential output terminal of the differential driver 18. The illustration of the passive equalizer 1 is omitted in FIG. 9.

In case of a differential transmission, a ground is referred for a bias compensation around the differential driver 18 or the differential receiver 41 and a perfect match is realized. However, since the crosstalk is generated if there is a solid ground, it is preferable to minimize the length in this portion. Any influence due to the existence of the solid ground with respect to the conventional differential structure is not generated within a bandwidth of several GHz.

Also in the fourth preferred embodiment, it is possible to use the wiring pattern having a layered structure for a wiring of a printed circuit board (not shown) mounting the differential driver 18 and the differential receiver 41. It will be explained showing a diagram as below.

Figure 10:
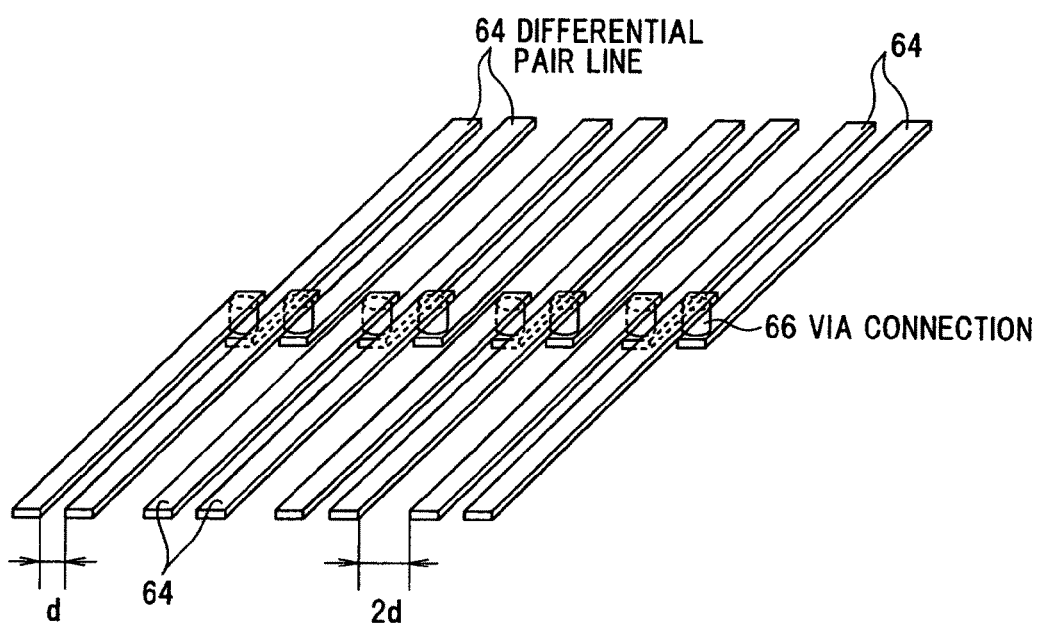
FIG. 10 is a perspective view showing a structure of a differential pair line in a printed circuit board in the fourth preferred embodiment according to the present invention.

FIG. 10 is a perspective view showing a structure of a differential pair line in a printed circuit board. The differential pair line 64 comprises a pair of belt-like wiring pattern with a predetermined clearance above and below and they are connected each other with a via connection 66 at the portion where a step is needed to be provided.

To minimize a discontinuous point of a via hole on the printed circuit board which causes a signal reflection, an interlayer is connected by a via hole diameter equal to the wiring width w of the differential pair line 64 as shown in FIG. 10.

The differential pair line 64 is required not to have attenuation or an interfusion of noise. A structure such as a joint of the transmission line, especially a connector, is important for this. Therefore, for the connector, it is preferable to use a differential connector which can generate characteristic impedance in high accuracy.

Since the impedance of the differential pair line 64 is $Z_0=100\Omega$, although the clearance d is provided to wire between pair wirings, all of solid ground and solid power source around the differential pair line 64 is removed in the printed circuit board. It is preferable to wire providing a clearance of 2d between the differential pair lines 64. The crosstalk is thus almost eliminated.

Fifth Embodiment

Figure 11:
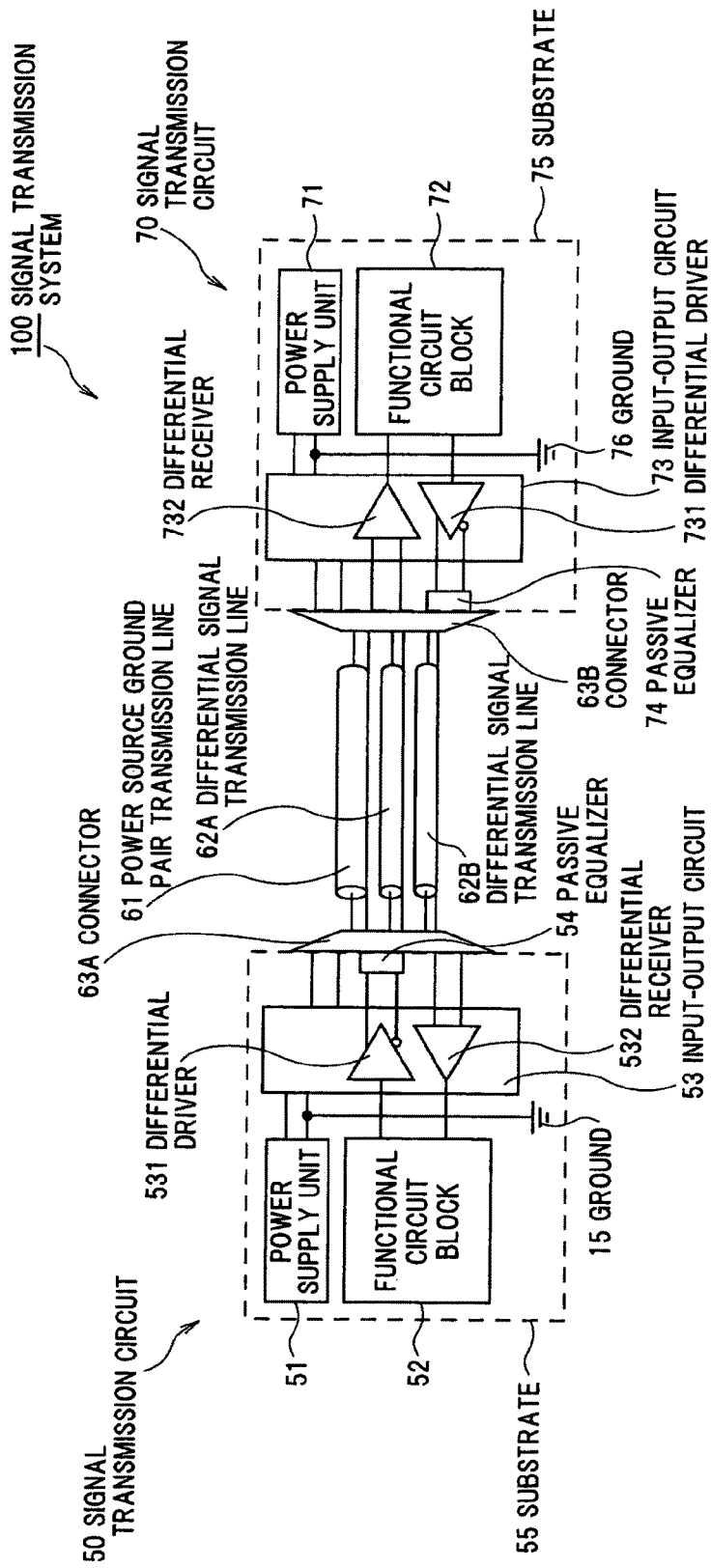
FIG. 11 shows a connection wiring diagram of a signal transmission system in the fifth preferred embodiment according to the present invention.

FIG. 11 shows a connection wiring diagram of the signal transmission system in the fifth preferred embodiment according to the present invention. This preferred embodiment is configured using the signal transmission circuit 10 according to the second preferred embodiment.

Structure of the Signal Transmission System

The signal transmission system 100 comprises a signal transmission circuit 50, a power source ground pair transmission line 61 connected to the signal transmission circuit 50, differential signal transmission lines 62A and 62B and a signal transmission circuit 70 connected to these differential signal transmission lines 62A and 62B.

The signal transmission circuit 50 comprises a power supply unit 51 for supplying direct current electricity to each circuit in the signal transmission circuit 50, a functional circuit block 52 for generating a transmitting signal or the like, an input-output circuit 53 for implementing an input-output processing with respect to the functional circuit block 52 and the differential signal transmission lines 62A and 62B, a passive equalizer 54 having a same structure as the passive equalizer 1 shown in FIG. 1 and FIG. 6, and a substrate 55 mounting each circuit of the signal transmission circuit 50 side.

The input-output circuit 53 comprises a differential driver 531 provided between the functional circuit block 52 and the passive equalizer 54, and a differential receiver 532 provided between the functional circuit block 52 and a connector 63A.

The signal transmission circuit 70 comprises a power supply unit 71 for supplying direct current electricity to each circuit in the signal transmission circuit 70, a functional circuit block 72 for generating a transmitting signal or the like, an input-output circuit 73 for implementing an input-output processing with respect to the functional circuit block 72 and the differential signal transmission lines 62A and 62B, a passive equalizer 74 having a same structure as the passive equalizer 1 shown in FIG. 1 and FIG. 6, and a substrate 75 mounting each circuit of the signal transmission circuit 70 side.

The input-output circuit 73 comprises a differential driver 731 provided between the functional circuit block 72 and the passive equalizer 74, and a differential receiver 732 provided between the functional circuit block 72 and a connector 63B.

The power source ground pair transmission line 61 and the differential signal transmission lines 62A and 62B are connected to the signal transmission circuits 50 and 70 through the connectors 63A and 63B. The differential signal transmission lines 62A and 62B comprise a transmission line paired with a ground having a same cross-section shape as a signal line in a single end signal.

Operation of the Signal Transmission System

A transmitting signal from the functional circuit block 52 is input to the passive equalizer 54 through the differential driver 531 of the input-output circuit 53, is output to the differential signal transmission line 62A from the connector 63A after the signal is corrected at the passive equalizer 54 and is transmitted to the signal transmission circuit 70 through the differential signal transmission line 62A.

The signal transmission circuit 70 receives a signal from the differential signal transmission line 62A at the differential receiver 732 through the connector 63B and outputs to the functional circuit block 72. The functional circuit block 72 processes the received signal from the differential receiver 732.

Further, the transmitting signal from the functional circuit block 72 is input to the passive equalizer 74 through the differential driver 731 of the input-output circuit 73, is output to the differential signal transmission line 62B from the connector 63B after the signal is corrected at the passive equalizer 74 and is transmitted to the signal transmission circuit 50 through the differential signal transmission line 62B.

The signal transmission circuit 50 receives a signal from the differential signal transmission line 62B at the differential receiver 532 through the connector 63A and outputs to the functional circuit block 52. The functional circuit block 52 processes the received signal from the differential receiver 532.

Further, output power from the respective power supply units 51 and 71 is output to the power source ground pair transmission line 61 and it allows the system to continue the operation even if a power failure occurs in either the signal transmission circuit 50 or 70.

Other Embodiments

The present invention is not limited to the preferred embodiments, and various modifications may be provided within a scope that does not change its gist. For example, it is possible to arbitrarily combine essential features of each embodiment.

For example, in the first and second preferred embodiments, it is possible that the first resistance 13 and the third resistance 21 are not provided in the parallel circuit or set to be 1 M$\Omega$ or more, and it is possible to obtain a symmetrical spike waveform by $CZ=L/R_2$.

Further, it is possible to limit a range of low frequency by inserting a highpass filter into a transmission system and also to limit a range of high frequency by controlling a time constant. Obtaining gaussian waveform easily means that it is fully possible to use for a gaussian waveform signal processing system. There is no conventional device in which a digital waveform can be easily converted into UWB (Ultra WideBand) signal like this.

Further, the passive equalizers 1, 54 and 74 are provided on the transmitting side in each preferred embodiment, it is possible to provide on the receiving side (a receiver side). In this case, a series circuit comprising the first inductor and the second resistance, and, the second inductor and the fourth resistance, is connected to the input terminal side of the receiver 40 and the differential receiver 41.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A signal transmission circuit, comprising:
   a transmitting circuit for outputting a transmitting signal to
      a transmission line;

a parallel circuit comprising a capacitor and a first resistance connected between an output terminal of the transmitting circuit and the transmission line; and a series circuit comprising an inductor and a second resistance connected between an output side of the parallel circuit and a ground, wherein the transmitting circuit satisfies a relation: $tr \geq CZ$ or $tf \geq CZ$, where tr and tf are a rise time and a fall time, respectively, of an output waveform of the transmitting circuit, Z is a characteristic impedance of the transmission line, and C is an electrostatic capacitance of the capacitor, or wherein the transmitting circuit satisfies a relation $tr \geq L/R_2$ or $tf \geq L/R_2$, where a rise time and a fall time of an output waveform of the transmitting circuit are tr and tf, respectively, a resistance value of the second resistance is $R_2$ and an inductance of the inductor is L.

2. A signal transmission circuit, comprising:

a transmitting circuit for outputting a differential signal from first and second output terminals thereof to a differential signal transmission line;

a first parallel circuit comprising a first capacitor and a first resistance connected between the first output terminal of the transmitting circuit and the differential signal transmission line;

a first series circuit comprising a first inductor and a second resistance connected between an output side of the first parallel circuit and a ground;

a second parallel circuit comprising a second capacitor and a third resistance connected between the second output terminal of the transmitting circuit and the differential transmission line; and a second series circuit comprising a second inductor and a fourth resistance connected between an output side of the second parallel circuit and the ground.

3. The signal transmission circuit according to claim 2, wherein the signal transmission circuit satisfies a relation: $tr \geq CZ$ or $tf \geq CZ$, where tr and tf are a rise time and a fall time, respectively, of an output waveform of the transmitting circuit, Z is a characteristic impedance of the differential signal transmission line, and C is an electrostatic capacitance of the first capacitor and the second capacitor.

4. The signal transmission circuit according to claim 2, wherein the signal transmission circuit satisfies a relation: $tr \geq L/R_2$ or $tf \geq L/R_2$, where a rise time and a fall time of an output waveform of the transmitting circuit are tr and tf, respectively, a resistance value of the second resistance and the fourth resistance is $R_2$ and an inductance of the first inductor and the second inductor is L.

5. A signal transmission system, comprising:

a transmission line comprising a power source ground pair transmission line and a ground line;

a transmitting circuit for outputting a transmitting signal to the transmission line;

a receiving circuit for receiving a signal from the transmission line;

a parallel circuit comprising a capacitor and a first resistance connected between an output terminal of the transmitting circuit and the transmission line; and a series circuit comprising an inductor and a second resistance connected between an output side of the parallel circuit and a ground, wherein the transmission line comprises a stacked pair transmission line that a signal line is paired with a ground line, the signal line and the ground line having a belt-shaped wiring pattern.

6. The signal transmission system according to claim 5, wherein the stacked pair transmission line comprises a wiring width w that is approximately equal to a clearance d between adjacent stacked pairs of wiring.

7. A signal transmission system, comprising:

a differential signal transmission line for transmitting a differential signal;

a transmitting circuit for outputting the differential signal from first and second output terminals thereto to the differential signal transmission line;

a receiving circuit for receiving a signal from the differential signal transmission line;

a first parallel circuit comprising a first capacitor and a first resistance connected between the first output terminal of the transmitting circuit and the differential signal transmission line;

a first series circuit comprising a first inductor and a second resistance connected between an output side of the first parallel circuit and a ground;

a second parallel circuit comprising a second capacitor and a third resistance connected between the second output terminal of the transmitting circuit and the differential signal transmission line; and a second series circuit comprising a second inductor and a fourth resistance connected between an output side of the second parallel circuit and the ground.

8. The signal transmission system according to claim 7, wherein the differential signal transmission line comprises a clearance of 2d or more between adjacent pairs of wiring where d is a clearance between one pair of wirings.

9. The signal transmission system according to claim 7, wherein the signal transmission system satisfies a relation: $tr \geq CZ$ or $tf \geq CZ$, where tr and tf are a rise time and a fall time, respectively, of an output waveform of the transmitting circuit, Z is a characteristic impedance of the differential signal transmission line, and C is an electrostatic capacitance of the first capacitor and the second capacitor.

10. The signal transmission system according to claim 7, wherein the signal transmission system satisfies a relation: $tr \geq L/R_2$ or $tf \geq L/R_2$, where a rise time and a fall time of an output waveform of the transmitting circuit are tr and tf, respectively, a resistance value of the second resistance and the fourth resistance is $R_2$ and an inductance of the first inductor and the second inductor is L.

11. The signal transmission system according to claim 7, wherein the differential signal transmission line comprises a power source ground pair transmission line.

* * * * *